No. 660,095. Patented Oct. 23, 1900.
J. M. ESSIG.
WEEDER.
(Application filed July 5, 1900.)
(No Model.)

WITNESSES:
Adelaide Kearns.
Alice Kearns.

James M. Essig
INVENTOR
BY Chapin & Denny
His ATTORNEYS

UNITED STATES PATENT OFFICE.

JAMES M. ESSIG, OF POE, INDIANA.

WEEDER.

SPECIFICATION forming part of Letters Patent No. 660,095, dated October 23, 1900.

Application filed July 5, 1900. Serial No. 22,569. (No model.)

*To all whom it may concern:*

Be it known that I, JAMES M. ESSIG, a citizen of the United States, residing at Poe, in the county of Allen, in the State of Indiana, have invented certain new and useful Improvements in Weeders; and I do hereby declare that the following is a full, clear, and exact description of the invention, which will enable others skilled in the art to which it appertains to make and use the same, reference being had to the accompanying drawings, which form part of this specification.

My present invention relates to that class of agricultural implements known as "weeders" or "cultivators." It is well known that implements of this class are not effective unless the teeth are kept quite sharp and that in use the teeth soon wear off rounding at the point, which requires the delay and expense of detaching the teeth and having them sharpened.

The object, therefore, of my invention is to provide a cheap, simple, substantial, and efficient weeder or cultivator whose teeth are reversible and self-sharpening by use.

The novel feature of my improvement consists in the form, relative arrangement, and combination of the pendent spring-fingers and the reversible teeth.

My improvement consists of a supporting-frame comprising three horizontal bars in parallel arrangement, rigidly connected by transverse strips and provided with thills and operating handle-bars, a series of pendent spring-fingers in parallel arrangement on said strips, and a series of reversible teeth detachably mounted in the lower end of said fingers.

In the accompanying drawings similar reference-numerals indicate like parts throughout the several views, in which—

Figure 1:
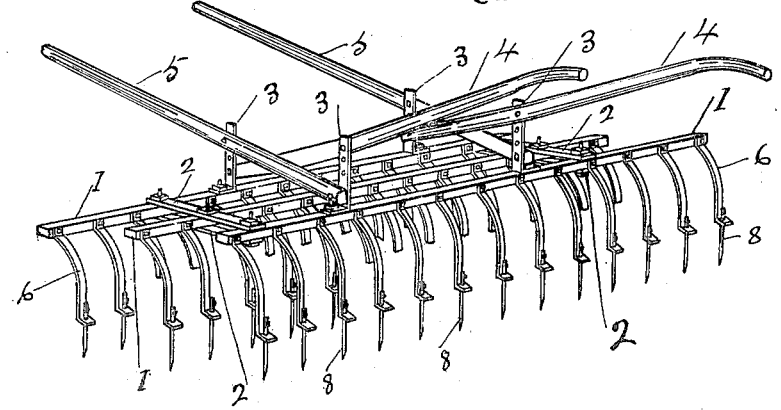
Figure 2:
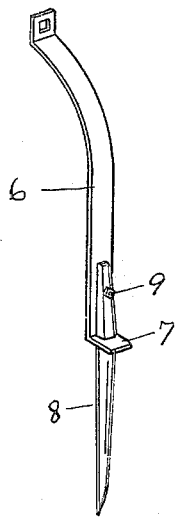
Figure 3:

Figure 1 is a perspective view of my improvement with a portion of the reversible teeth omitted and with the thills and a portion of the spring-fingers broken away in part. Fig. 2 is an enlarged detail of one of the pendent spring-fingers with a reversible tooth in operative position therein. Fig. 3 is an enlarged detail of one of the reversible teeth, and Fig. 4 is an enlarged detail of another form of said teeth.

Referring now to Fig. 1, the frame of my improved cultivator consists of a plurality of horizontal bars 1, of any suitable material, in horizontal arrangement, but whose ends are out of transverse alinement for the purpose of making each tooth track intermediate of the two teeth immediately in advance thereof, as shown. These bars 1 are rigidly connected by the transverse strips 2, which are bolted thereto in any proper manner. On the two outer of said bars 1 are rigidly fixed or bolted the upright standards 3, provided with a series of measured lateral perforations in which the forward ends of the handle-bars 4 are bolted and by means of which they can be adjusted to any desired angle or inclination. In like manner the rear ends of the thills 5 are rigidly secured to the said standards at any desired inclination. To either the forward or rear face of the said bars 1 are rigidly bolted or otherwise secured the pendent spring-fingers 6, of flat spring-steel, whose upper ends are curved, angled, and perforated, as shown in Fig. 2, the apertured upper ends being adapted to receive proper holding-bolts. The lower ends of said fingers are also angled and apertured at 7 to receive the pendent teeth 8. The teeth 8, of proper dimensions, are rounded and sharpened at their lower ends, as shown, and have their upper ends made angular to more securely rest within the angular openings in the lugs 7 and against the outer face of the said spring-fingers 6. The upper ends of the said teeth 8 are provided with lateral perforations adapted to receive proper holding-bolts 9, which also pass through registering perforations in the said spring-fingers 6, thereby rigidly but detachably securing the said teeth in position upon the rear faces of the said fingers and in the said apertured lugs 7. The mere form of the teeth 8 is of course immaterial so long as they have their lower ends properly pointed and their upper angular ends adapted to be adjusted and contained within the said lug 7 and suitably apertured to receive the holding-bolts 9.

Figure 4:
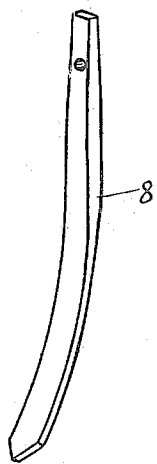

A modified form of tooth is shown in Fig. 4, which differs only in the form of its pointed end and in the fact that it is detachable, but not reversible.

The manner of employing my invention thus described is obvious and, briefly stated, is as follows: When the teeth 8 have become worn off, rounding at their lower ends, as shown in Fig. 3, the operator detaches them by removing the bolt 9 and then replaces them in a reversed position—that is, with their worn sides to the rear, as shown in Figs. 1, 2, and 3. The points of the teeth will again wear off on their front sides as they are shown worn off on their rear faces, after which they can be again reversed, and in this manner they are made self-sharpening until entirely worn out.

Having thus described my invention and the manner of using the same, what I desire to secure by Letters Patent is—

1. In a weeder or cultivator a pendent spring-finger bent, angled, and apertured at its upper end for the purpose specified, and provided at its lower end with an apertured lateral lug adapted to contain the upper end of a reversible tooth; in combination with a reversible tooth having a laterally-apertured upper end adapted to be detachably secured in said lug as described.

2. The combination of a pendent spring-finger provided upon its lower end with a vertically-apertured lateral lug; and a reversible tooth whose upper end is adapted to be arranged in said lug and rigidly secured therein by a proper holding-bolt.

3. In a weeder a reversible tooth having its angular upper end apertured to receive a holding-bolt by which it is rigidly secured to a suitable spring-finger.

Signed by me at Fort Wayne, Allen county, State of Indiana, this 30th day of June, 1900.

JAMES M. ESSIG.

Witnesses:
ADELAIDE KEARNS,
ALICE KEARNS.